United States Patent [19]

Wintermantel et al.

[11] Patent Number: 4,799,822

[45] Date of Patent: Jan. 24, 1989

[54] PROFILE ELEMENTS, PARTICULARLY FOR SUPPLY AND/OR REMOVAL OF SUBSTANCES FROM ENVIRONMENTAL AND/OR FLOW MATERIAL

[75] Inventors: Erich Wintermantel, Jahnallee 41,5300, Bonn 2; Oswald Landwehr, Meckenheim, both of Fed. Rep. of Germany

[73] Assignee: Erich Wintermantel, Fed. Rep. of Germany

[21] Appl. No.: 912,602

[22] PCT Filed: Jan. 17, 1986

[86] PCT No.: PCT/EP86/00031

§ 371 Date: Sep. 2, 1986

§ 102(e) Date: Sep. 2, 1986

[87] PCT Pub. No.: WO86/04211

PCT Pub. Date: Jul. 31, 1986

[30] Foreign Application Priority Data

Jan. 21, 1985 [DE] Fed. Rep. of Germany ....... 3501748

[51] Int. Cl.$^4$ .................. E02B 13/00; A01G 25/00
[52] U.S. Cl. ......................... 405/46; 405/45; 405/43; 47/1 R; 47/48.5; 47/79
[58] Field of Search ............... 405/36, 43–46, 405/50, 51; 47/1 R, 27, 48.5, 59–65, 79–82; 210/170, 483–485, 488, 747

[56] References Cited

U.S. PATENT DOCUMENTS

| | | | |
|---|---|---|---|
| 1,576,790 | 3/1926 | Roessner | 405/44 |
| 2,346,029 | 4/1944 | Jennings | 405/45 X |
| 2,445,717 | 7/1948 | Richards | 405/45 X |
| 2,653,449 | 9/1953 | Stauch | 47/48.5 X |
| 3,965,686 | 6/1976 | Saito et al. | 405/43 |
| 4,056,899 | 11/1977 | Close | 47/49 |
| 4,178,715 | 12/1979 | Greenbaum | 42/27 X |
| 4,313,692 | 2/1982 | Johnson | 405/46 X |
| 4,557,071 | 12/1985 | Fah | 47/48.5 X |
| 4,579,658 | 4/1986 | Moller | 210/483 |
| 4,588,325 | 5/1986 | Seefert | 405/46 |

FOREIGN PATENT DOCUMENTS

| | | |
|---|---|---|
| 369620 | 1/1983 | Austria . |
| 2019423 | 2/1972 | Fed. Rep. of Germany . |
| 2508271 | 12/1982 | France . |
| 307234 | 5/1955 | Switzerland . |
| 603029 | 8/1978 | Switzerland . |

*Primary Examiner*—Randolph A. Reese
*Assistant Examiner*—John A. Ricer
*Attorney, Agent, or Firm*—Wall and Roehrig

[57] ABSTRACT

Profile elements are provided for enriching or purifying substances that have different states, i.e., an environmental material and a fluid material. The profile elements for supply or removal of fluid substances to or from granulated, fibrous, or soil-like material in the environment surrounding the profile elements comprise a plurality of spaced apart webs and boundary walls that connect to webs and are supported by them. These elements then define a plurality of longitudinal channels arrayed side-by-side between the webs. The boundary walls are shaped to have a surface area substantially greater than equivalent flat walls. At least a portion of the webs and the boundary walls is pierced or perforated, as if a mesh or lattice, to permit fluid communication between adjacent channels and/or between the channels and the surrounding environment.

13 Claims, 10 Drawing Sheets

| 18.1 | 18.2 | 18.3 | 18.4 | 18.5 |

PROFILE ELEMENTS, PARTICULARLY FOR SUPPLY AND/OR REMOVAL OF SUBSTANCES FROM ENVIRONMENTAL AND/OR FLOW MATERIAL

TECHNICAL FIELD

This invention relates to the construction and geometry of profile elements and to their applications, The profile elements in accordance with the invention are particularly useful for the purpose of supply to or removal of substances from gases, liquids and more or less granulated and/or fibrous and/or crumbly solid material, such as for example soil, in open and closed spaces and in the open air, in households, in horticulture, in agriculture, in industry and in protection of the environment.

BACKGROUND OF THE INVENTION

For the purpose of enrichment and/or purification and/or dressing or refining, it is known to cause substances having different properties which are harmonized with one another and, as a rule, a different state to penetrate one another and in so doing to act, on one another. In order to ensure controlled reproducible penetration and effect conditions, stratification methods and procedures possibly along with the use of separating and enrichment and/or purification elements are known.

For the supplying of cultures with water and oxygen, besides the customary surface sprinkling or aeration, supply from an underlying store along with the use of double-bottom containers is known. The construction of such containers with an upper bottom as separating element between the soil culture that is to be supplied and the storage space and an actual container lower bottom tightly sealing the same off downwardly has in the past been achieved in any of the following ways:

(a) The upper bottom is, like the lower bottom, an integral constituent prt of the container walling.

(b) The upper bottom is an integral constituent and the walling of an internal container and the lower bottom is an integral constituent part of an external container.

(c) The upper bottom is supported on supporting noses which are an integral constituent part of the container walling.

(d) The upper bottom is supported on supporting uprights or supporting pillars, which are either an integral constituent part of the upper bottom or of the lower bottom.

(e) The upper bottom is supported on supporting uprights or supporting pillars which are detachable structural elements.

The upper bottoms in accordance with (a) and (b) are given their bering capacity chiefly through their connection to the container walling and possibly additionally through an arched shaping (bottle bottom). The upper bottoms in accordance with (c) to (e) are as a rule flat and, depending on the frequency and spacing of the supporting elements, more or less stiff or flexible; the force transmission to the container wall or the lower bottom takes place primarily punctiformly or linearly. The upper bottoms in accordance with (a) to (e) are in themselves single-walled in design and possibly ribbed and they can be perforated in a sieve-like -or lattice-like manner. They are, as a rule, produced from metal or plastics material.

Transportation of the medium present in the store onto and into the soil culture takes place in the case of gases in a natural way by convection and pressure or partial pressure gradients. Where the gas is disposed an an intervening layer above a stored liquid, transportation of evaporated liquid takes place at the same time as transport of the gas. This liquid transportation can additionally be considerably enhanced by absorbent (hygroscopic) wick cords, ribbons or webs, which lead from the liquid store into or onto the soil culture.

OBJECTS AND SUMMARY OF THE INVENTION

The invention proposes profile elements for the supply of and/or removal of substances from environmental and/or flow material, which, as compared with the known constructions have a boundary wall or respectively boundary walls which are profiled in a special, surface-enlarging manner which promotes the supply and/or removal function, are constructed in themselves in a sandwich-like or multi-tubular manner and have boundary walls which are arranged at a spacing from one another and are possibly integrally connected and which enclose a storage and/or flow space, in the case of sandwich-like or multi-tubular construction have, between the boundary walls and possibly connected integrally thereto, webs which promote the profiling of the boundary walls and/or subdivide the enclosed storage space into storage units and/or medium guidance channels, in the case of sandwich-like or multi-tubular construction have a storage space or storage units between the boundary walls which are filled wholly or partly with effective substances, for example filter packings or active carbon, consist of wall structures and possibly additional dividing structures which are, all over or only in partial regions promoting the supply and/or removal function, either perforated or pierced in a lattice-like manner, or liquid-tight but permeable to gas, or vice versa, or liquid-tight and gas-tight, consist of wall structures and possibly additional dividing structures which consist, throughout or only partial regions promoting the supply and/or removal function, of materials which are liquid-repelling (for example hydrophobic) or liquid-transporting (for example wick-like), With the profile elements in accordance with the invention, as compared with the prior art concerning supply of and/or removal of substances from environmental and/or flow material, more especially soil cultures, the result is achieved that an enhanced transportation flow, promoting the supply and/or removal procedure, of the substance to or removed from the environmental material, for example to the soil culture, occurs, and in the case of supply or removal of a liquid substance, a temporally and quantitatively controlled rapid supply phase can be inserted prior to the basic supply phase, in the case of use of profile elements which are constructed in a sandwich-like or multi-tubular manner, the loads introduced into the profile elements from the supply substance and the environmental material and forces possibly acting thereon, such as for example traffic loads, can be transmitted to their support over the entire surface area, upon use of profile elements in accordance with the invention which are constructed in a sandwich-like or multi-tubular manner, by virtue of their high stiffness and strength shape-stable containers and/or base supports covering the entire surface area can be dispensed with, by subdivision of one or more profile elements in accordance with the invention into storage units and/or medium guidance channels which are mutually separated from one another, the supply of and/or removal of substances formmixed cultures, in which different environmental zones have, in each case, also a different need for supply or removal of gaseous and/or liquid substances, is possible, by a combination of several profile elements in accordance with the invention with or without intermediate layers made from buffer material promoting the supply and/or removal function, the supply and/or removal procedure can be temporally and quantitatively controlled, possibly even interrupted, by use of profile elements in accordance with the inventon which are filled wholly or partly with effective substances which promote the supply and/or removal function, such as filter packings or active carbon, and/or by a combination of such profile elements with other ones without a filling, the substances being supplied or removed can itself be supplied or removed prior to entry into and/or upon exit from the environmental material.

DETAILED DESCRIPTION OF THE PREFERRED EMBODIMENTS

Figure 1:
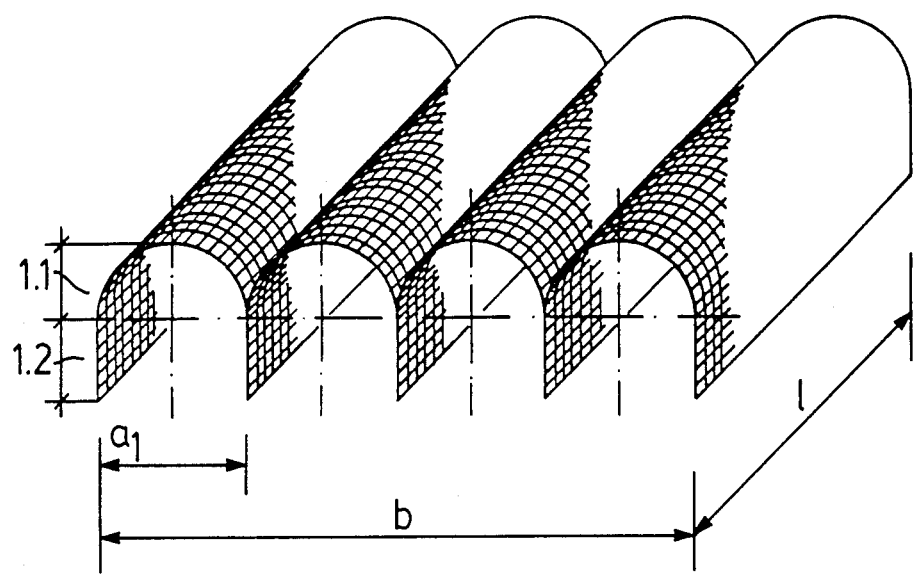
FIGS. 1 to 11 are fragmentary perspective views of various exemplary embodiments of profile elements in accordance with the invention.
Figure 2:
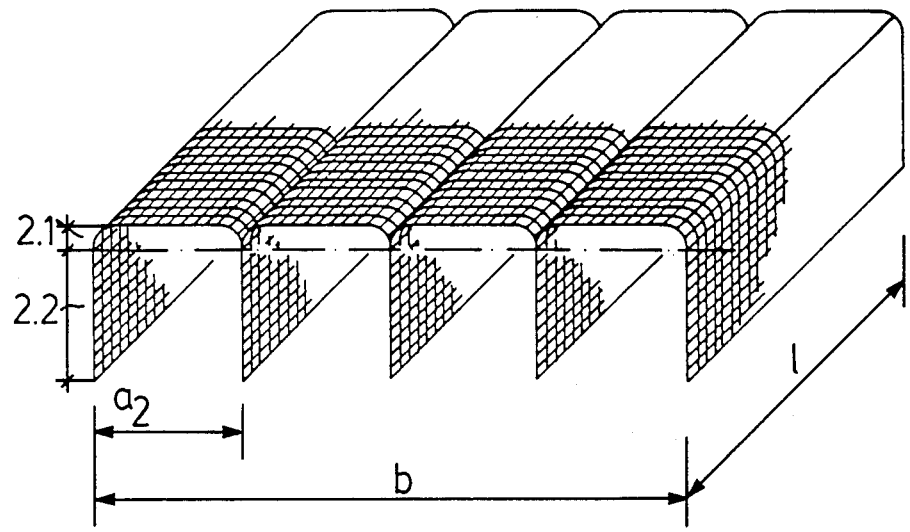

FIG. 1 shows a profile elements with a basal surface area $b \times l$ and with one embodiment of boundary wall 1.1. profiled in accordance with the invention. The projected width b of the boundary wall 1.1. when measured in a straight line is equal to $8.r_1$. However, the developed width of the material of the boundary wall 1.1. amounts, to $\pi/2.8 \cdot r_1$ and the developed surface area thus amounts to $\pi/2.8 \cdot r_1 \cdot l$. The developed surface area of the boundary wall 1.1 is thus greater by the factor $(\pi/2-1)$ than the projected or based surface area. The boundary wall 1.1. is supported by means of supporting webs 1.2 which are spaced a distance $a_1 2.r_1$ from one another. The boundary wall 1.1 and the supporting webs 1.2 are perforated or pierced in a lattice-like manner. The profile element in accordance with the invention can be, for example, a moulded or cast part, for example made from metal or plastics material, or it can be produced from a mesh-like fabric or gauze, for example of glass or of other suitable materials, which is stabilised and sealed with a plastics bedding composition, The profile element shown in FIG. 2 differs from that shown in FIG. 1 in that the spacing $a_2$ of the supporting webs 2.2 is greater than $2.r_2$ and thus the developed surface of the boundary wall 2.1 is greater than the projected or basal area by a factor of less than $\pi/1$.

Figure 3:
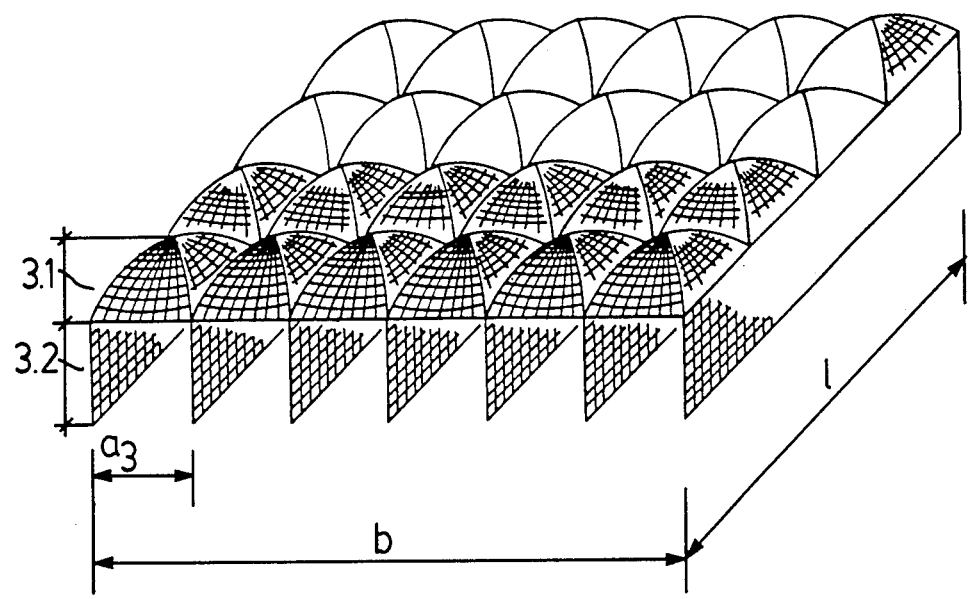

The profile element shown in FIG. 3 also differs from that shown in FIG. 1 in the manner of the profiling of the boundary wall 3.1. The spacing of the supporting webs 3.2 is certainly the same as in FIG. 1, i.e. $a_3 = 2.r_3$, but by virtue of a three-dimensional deformation of the boundary wall 3.1 the developed surface area is now greater than the projected or basal surface area of the profile element by a factor which is greater than $\pi/2$.

Figure 4:
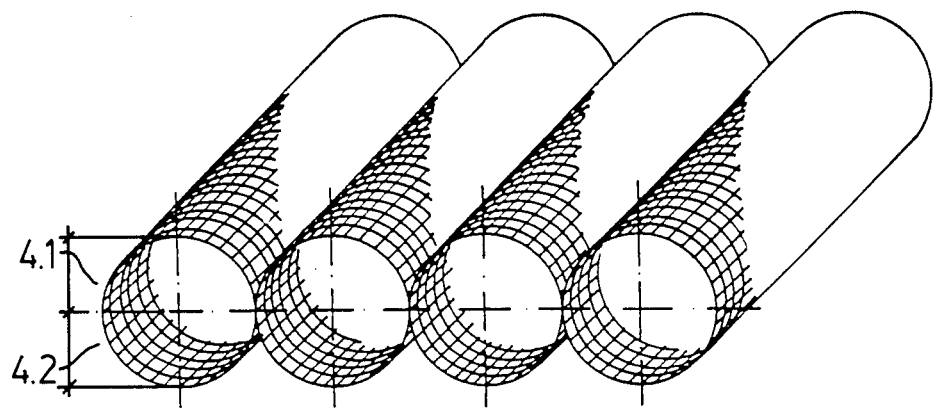

FIG. 4 shows a sandwich-like or multi-tubular profile element in which the supporting of the boundary wall 4.1 is undertaken by an integral opposing boundary wall 4.2. Both boundary walls 4.2, 4.2 are constructionally identical in design and correspond in each case to the boundary wall 1.1. in FIG. 1.

Figure 5:
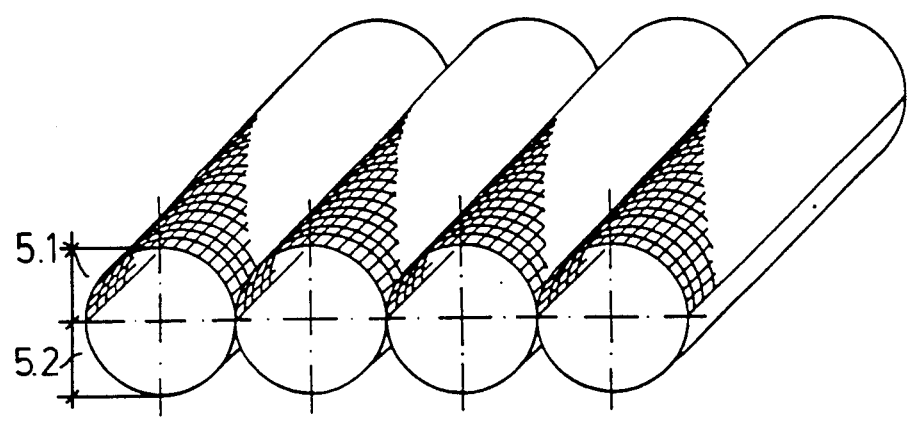

The profile element shown in FIG. 5 corresponds in geometrical structure to that shown in FIG. 4, but the boundary walls 5.1 and 5.2 are not perforated or pierced in a grid-like manner. The boundary wall 5.2 is liquid-tight and gas-tight, whilst the boundary wall 5.1 is liquid-tight in design, but permeable to gas.

Figure 6:
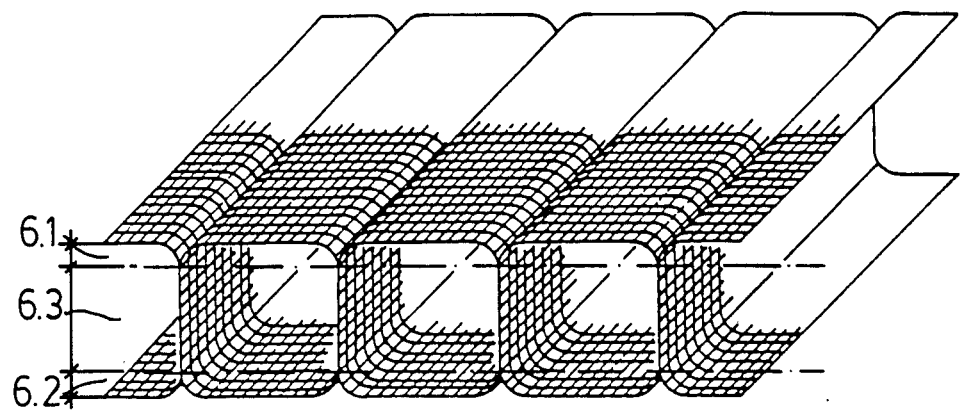

The profile element shown in FIG. 6 is, like that shown in FIG. 4, is constructed in a sandwich-like or multi-tubular manner with integral boundary walls 6.1 and 6.2. However, these boundary walls 6.1, 6.2 correspond in shape to the boundary wall 2.1 in FIG. 2 and the walls 6.1, 6.2 are connected together by means of supporting webs 6.3. Furthermore, the profile element shown in FIG. 6 is at its longitudinal sides not closed by supporting webs, but is open; the longitudinal side boundaries are formed by protruding parts of the boundary walls 6.1, 6.2.

Figure 7:
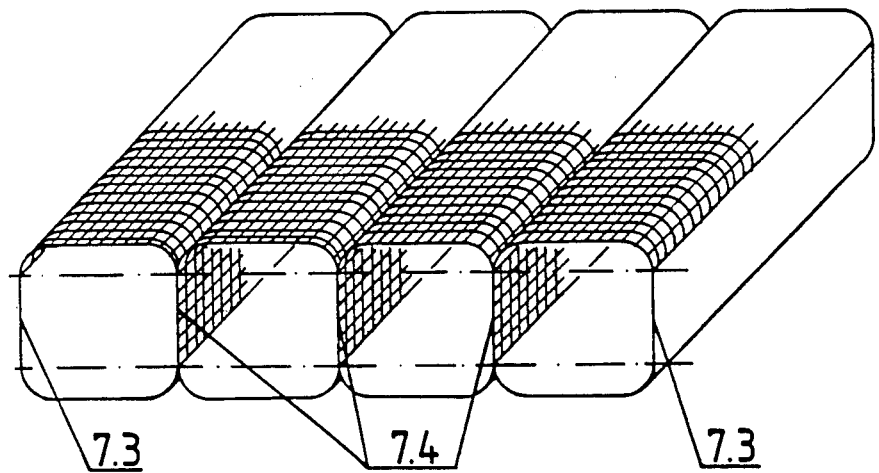

FIG. 7 shows a profile element with a geometrical structure substantially the same as in FIG. 6, but which is closed at its longitudinal sides by terminal supporting webs 7.3. These terminal supporting webs 7.3 as well as the boundary wall 7.2 are, unlike the embodiment illustrated in FIG. 6, *not* pierced in a lattice-like or grid-like manner, but instead are closed in a liquid-tight and, possibly, gas-tight manner. In contrast, the supporting webs 7.4 arranged inside the profile element and the boundary wall 7.1 remain open in a grating-like manner.

Figure 8:
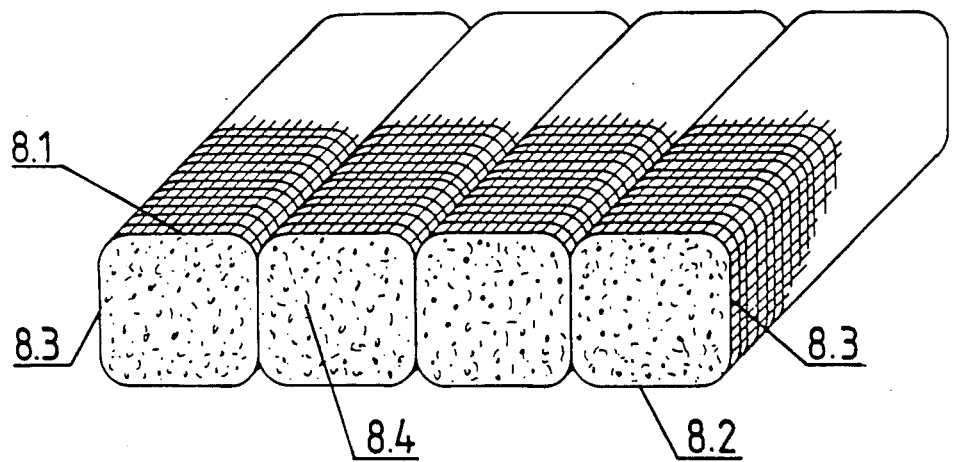

The profile element shown in FIG. 8 again corresponds generally to that shown in FIG. 6, but it is closed at its longitudinal sides by terminal webs 8.3. Moreover, the space between the boundary walls 8.1 and 8.2 of this sandwich-like or multi-tubular profile element is completely filled with an effective substance, for example with filter material or with active carbon.

Figure 9:
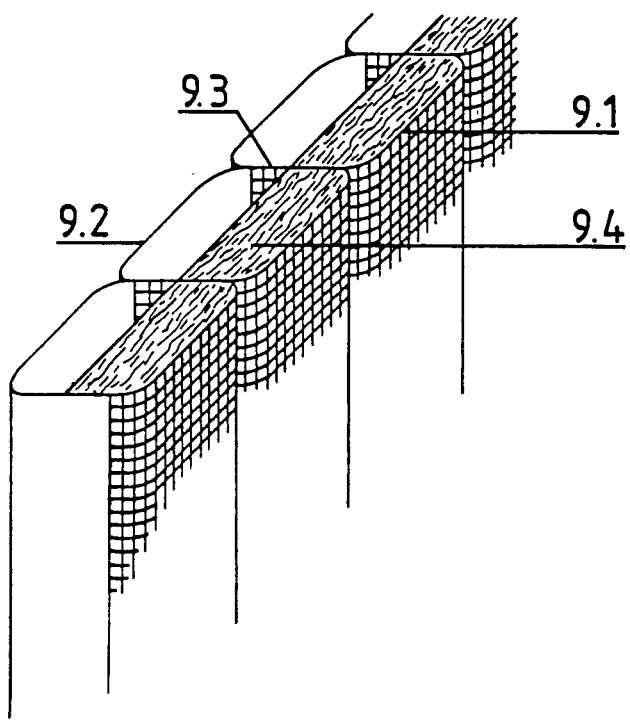

The profile element shown in FIG. 9 corresponds in structure to that shown in FIG. 7, although it is shown standing vertically instead of lying horizontally. The space between the boundary walls 9.1 and 9.2 is partially filled by a layer which covers or masks the entire surface of the perforated boundary wall 9.1 and which is intersected only by supporting webs 9.3. The layer comprises an effective substance such as a boundary fibre substance acting as a filter or bound active carbon.

Figure 10:
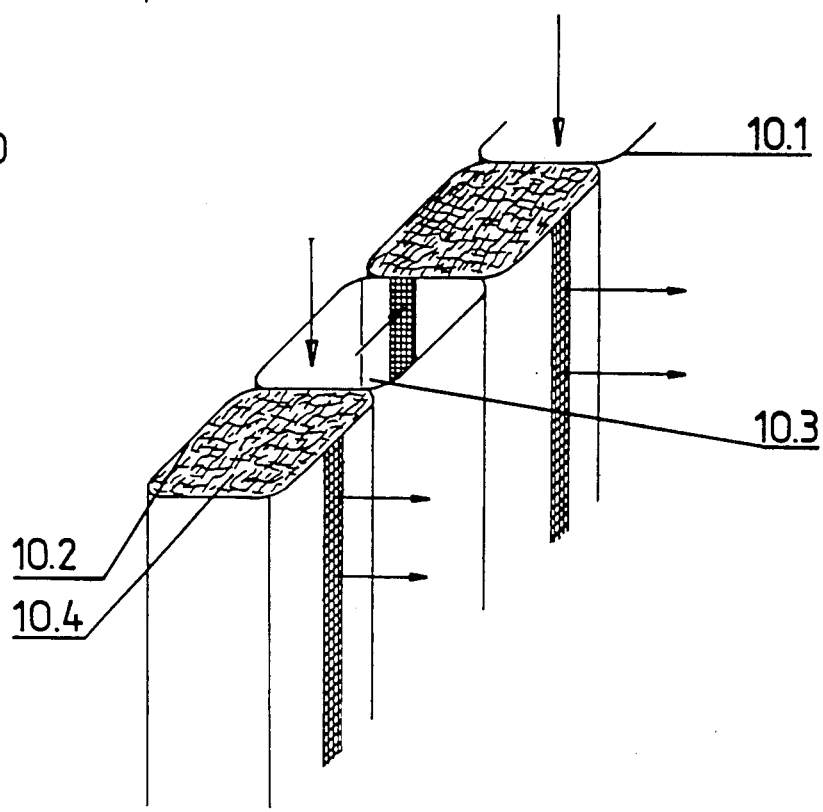

FIG. 10 shows a profile element which in some ways imitates those shown in FIG. 9 and FIG. 7. In the boundary wall 10.1 and the supporting webs 10.3 only relatively narrow longitudinal strips A are perforated or pierced in a grating-like manner. The space between the boundary walls 10.1 and 10.2 is subdivided by the supporting webs 10.3 into alternate storage units I and medium guidance channels II, in which respect the storage units I are completely filled with an effective substance 10.4.

Figure 11:
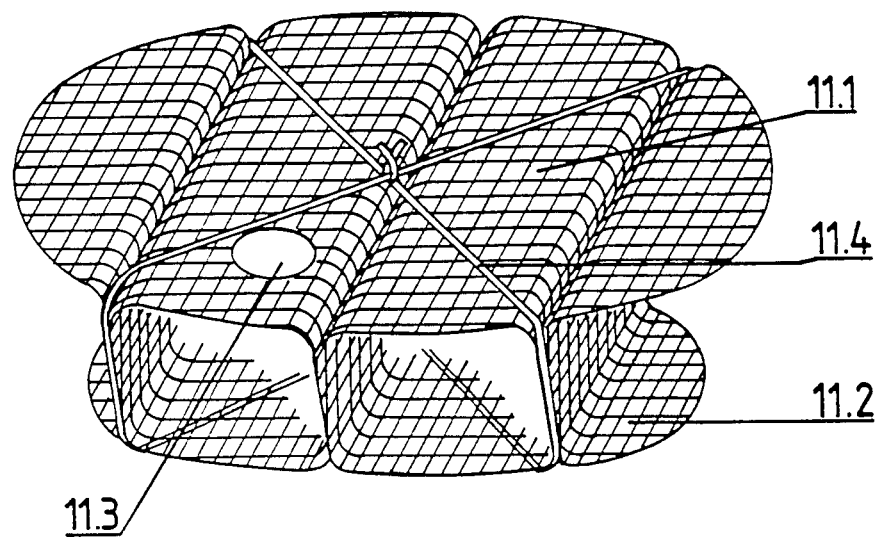

FIG. 11 shows a profile element which is similar in constructional design to that shown in FIG. 6, but which has, instead of a rectangular basal surface area, a round basal surface area, and is provided in its boundary wall 11.1 with aperture 11.3 for a filling tube or pipe. Furthermore, this profile element is equipped with a wick cord 11.4 to enhance transportation of liquid out of the storage space between the boundary walls 11.1 and 11.2 onto the surfaces of the boundary walls 11.1, 11.2.

Figure 12:
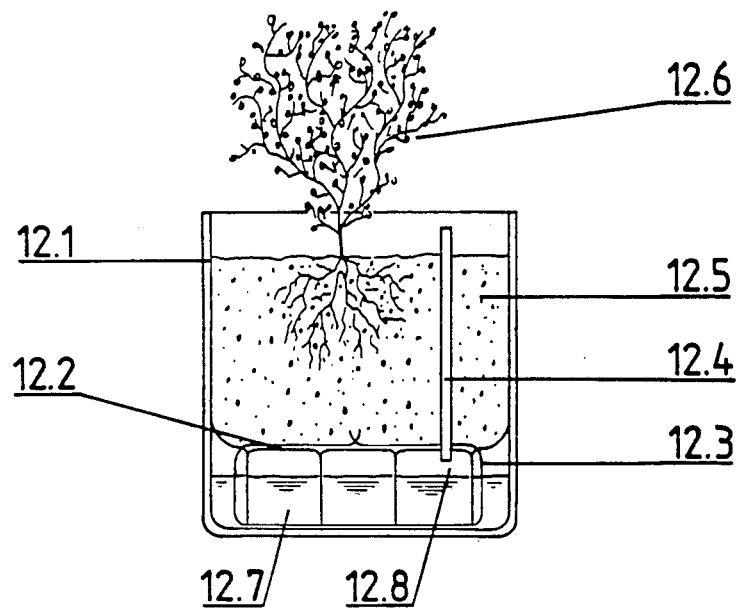
FIGS. 12 to 19 show the exemplary profile elements of FIGS. 1 to 11 in exemplary applications for the supply and removal of environmental and possibly flow material. In the case of FIGS. 12 to 17 it is a matter of the environmental material around soil cultures.

FIG. 12 shows a shape stable plant container 12.1, into which a profile element 12.2 (based on that shown in FIG. 2) with a wick cord 12.3 and a filling and filling-level measuring tube 12.4 has been inserted. A plant 12.6 has been planted in the soil 12.5 covering the element 12.2.

Liquid feeding material 12.7 and, thereabove, gaseous feeding material 12.8 are disposed in the subsoil or underlying store formed by the profile element 12.2. Upon complete filling of the store with liquid up to the level $H_{12}$, the soil covering 12.5 projects, by reason of the profiling, of the boundary wall of the profile element 12.2 in accordance with the invention, in a preset raster or grating, in an arrow-like manner into the feeding liquid. The soil 12.5 itself thus forms suction webs which extend parallel to one another and which, with a liquid level $H_{12}$, cause maximum liquid transportation by virtue of greatest mass immersion which then gradually decreases as the lower the liquid level $h_{12}$ is approached. When the liquid level in the store is less than $h_{12}$ liquid transportation takes place naturally in a considerably slowed-down manner by means of convection and pressure and/or partial pressure gradients as well as by way of the wick cord 12.3. In this respect, liquid transportation by convection is speeded up by the fact that the developed surface of the boundary wall of the profile element 12.2, which is pierced in a grating-like manner, and thus the exposed surface portion, aligned relative to the store, of the moisture-removing soil 12.5 is great, possibly even greater than the projected basal surface area of the profile element 12.2. (Example: If, in the construction of the boundary wall 1.1 of a profile element in accordance with FIG. 1, the ratio of grating surface to clear mesh aperture surface is 25:75, thus the sum of all the developed mesh aperture surfaces in the boundary wall is greater by the factor $\pi/2 \times 0.75$, in other words approximately by the factor 1.2, than the projected or basal area of the profile element).

Figure 13:
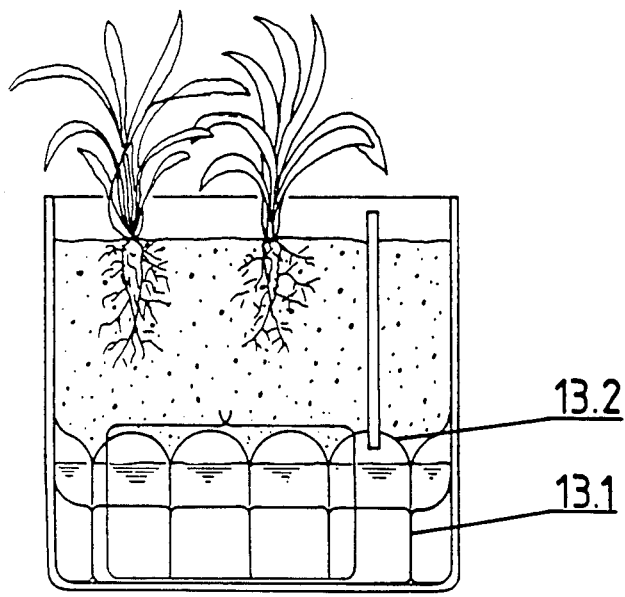

FIG. 13 corresponds to FIG. 12, but a first profile element 13.1 based on that shown in FIG. 6 and a second profile element 13.2 based on that shown in FIG. 1 have been inserted one above the other into the container; in this way an enlarged subsoil or underlying store has been created.

Figure 14:
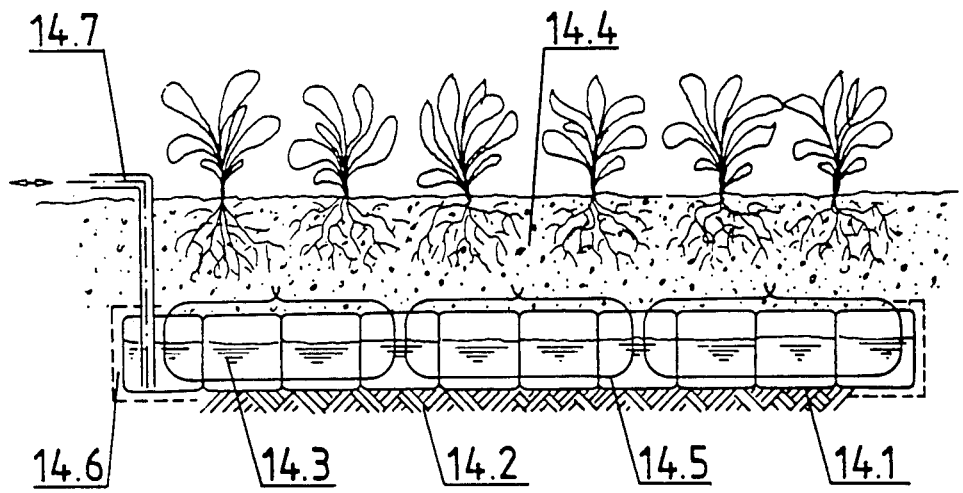

FIG. 14 shows all the essential features of FIG. 12, but here a profile element 14.1 based on that shown in FIG. 7 has been laid, for example outdoors, directly onto undisturbed soil 14.2. Since transportation of the liquid storage material 14.3 is to be effected exclusively towards the soil covering 14.4 in which plants are located, the suction wick 14.5 has been arranged around the profile element 14.1 such that it has no contact with the underlying soil 14.2. The end closure of the profile element 14.1 can either be an integral constituent part of the same or be effected by a special terminal element 14.6. Charging of the store with feeding material is effected by way of a connection 14.7, which may possibly also be used for emptying the store by means of suction if feeding of and/or waste removal from the soil 14.4 takes place by surface irrigation and a drainage function is associated with the store.

Figure 15:
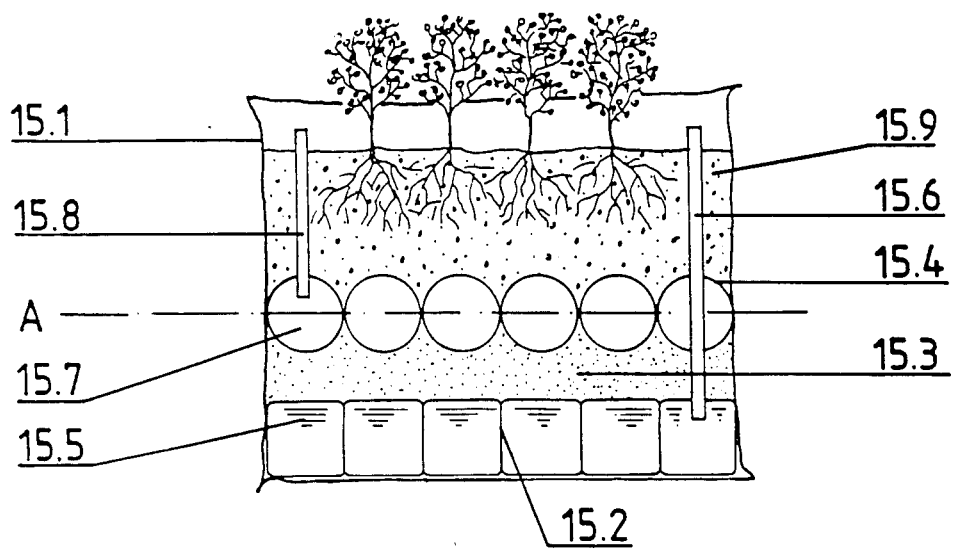

In the application of profile elements shown in FIG. 15, a first profile element 15.2 similar to that shown in FIG. 6, and for example, consisting in itself of a material which transports moisture in a wick-like manner, has been inserted into the bottom of a flexible liquid tight sheath 15.1, for example a plastic bag to form a subsoil store and underlying supporting structure for all the layers lying thereabove. The first element 15.2 is covered with an absorbent or hydroscopic bufferlayer 1.53 and a second profile element 15.4 similar to that shown in FIG. 4 is positioned thereabove. The soil culture thereabove corresponds to that shown in FIG. 12. Liquid feeding material 15.5 has been filled, by way of a filling pipe 15.6, into the first profile element 15.2 lying at the bottom. The second profile element 15.4 arranged thereabove contains gaseous supply material 15.7 and is accessible by way of a pipe connection 15.8. In the plane A, the topsoil 15.9 and the buffer layer 15.3 have linear contact with one another, whereby transportation of liquid out of the store 15.2 by way of the buffer zone 15.3 and into the topsoil 15.9 is ensured. Through forced ventilation of the upper profile element 15.4 and the moisture extraction necessarily associated therewith out of the adjoining topsoil 15.9 and the buffer layer 15.3, liquid flow from the bottom store to the topsoil 15.9 can be temporarily and quantitatively controlled and possibly even interrupted.

Figure 16:
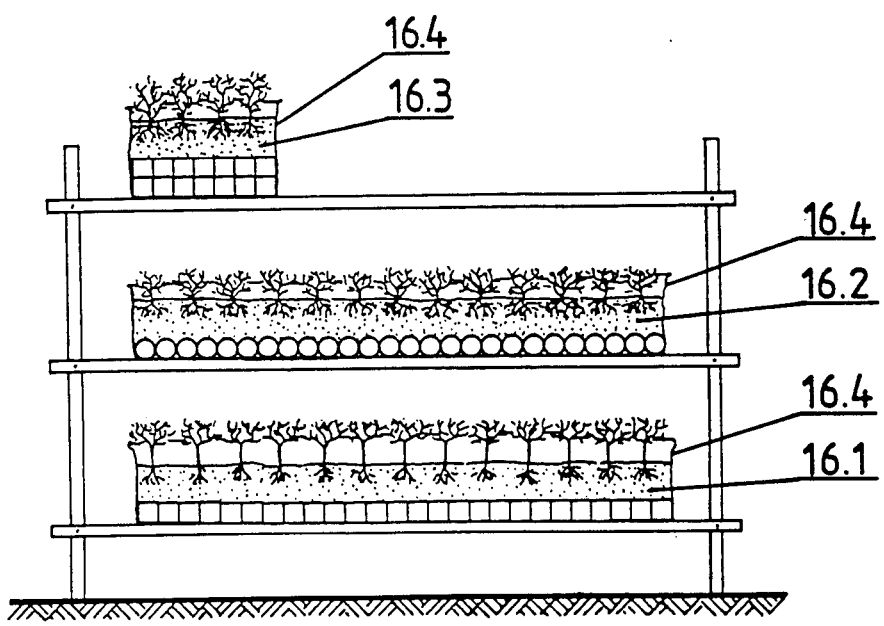

FIG. 16 shows various soil cultures 16.1, 16.2 and 16.3 similar to those shown in FIGS. 13 to FIG. 15 and using profile elements, constructed in a sandwich-like or multi-tubular manner as shown in FIG. 4 to FIG. 7. As a result of the bearing capacity of the sandwich-like or multi-tubular profile elements which have been used, cultures need neither an entire-area support nor a shape-stable container. In the illustration shown arranged one above the other in a stand and they are, in each case, supported only linearly by way of ledges or strips. Liquid-tight sealing of the subsoil stores is accomplished in each case by three-sided wrapping with foil 16.4.

Figure 17:
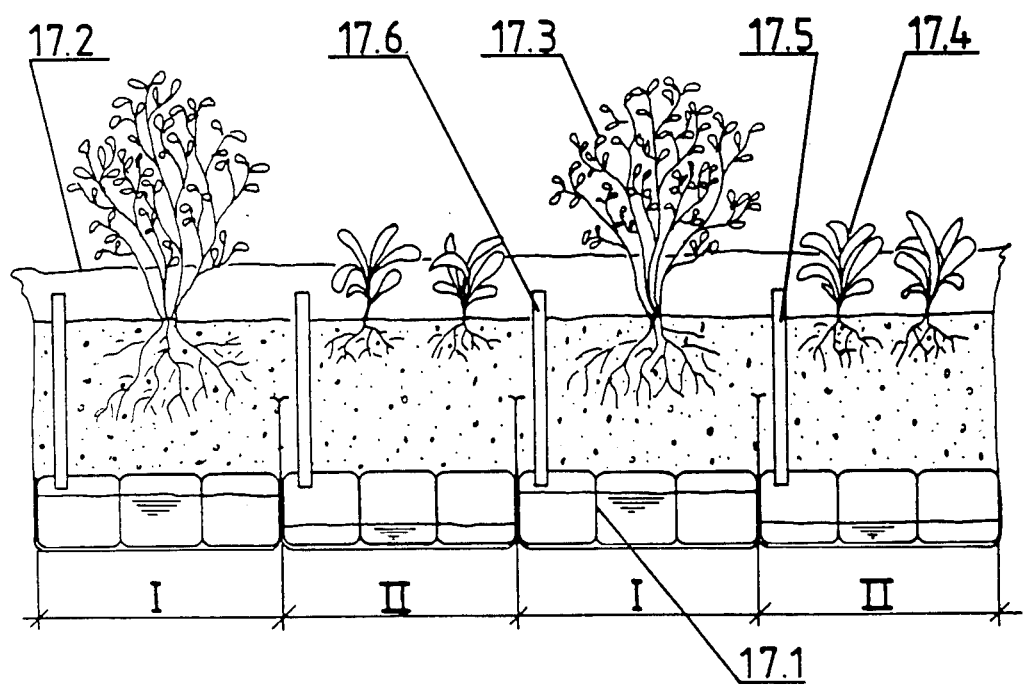

FIG. 17 shows an application of profile elements which is a development of that shown in FIG. 14 using profile elements as shown in FIG. 6. For the optimum supply or feeding of a mixed plant arrangement consisting of plants 17.3 on the one hand and plants 17.4 on the other hand, which in each case may have different requirements for liquid and/or nutrient solution, independent separately sealed off profile elements 17.1 or planting zones I and II have been prepared and planted alternately side-by-side. The feeding of the plants 17.3 and 17.4 in the zones I and II respectively takes place in a differently dosed manner so as to match their respective requirements by way of separate connections 17.5 and 17.6. The sealing of each subsoil store against the adjacent one and against the environment is effected, as described with regard to FIG. 16, by three-sided wrapping with foil 17.2.

Figure 18:
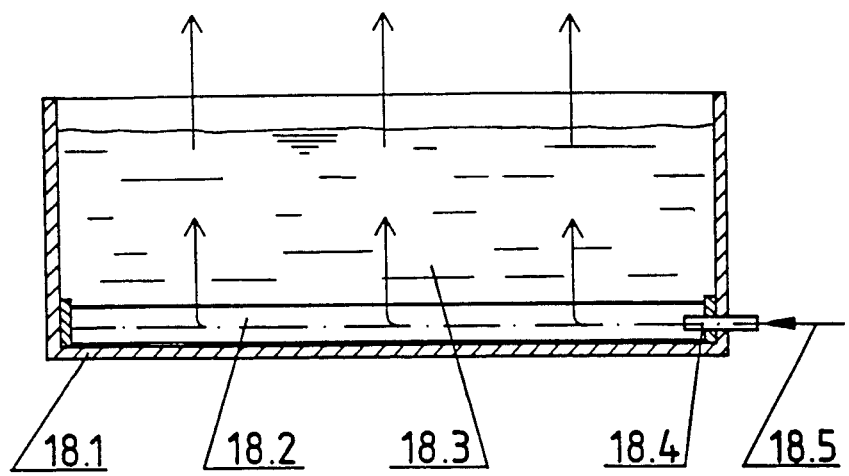

FIG. 18 shows a form-stable container 18.1, into which a profile element 18.2 having liquid-tight but gas-permeable boundary walls similar to that shown in FIG. 5 has been inserted. The ambient material 18.3 is liquid and it is supplied and/or purified by flow material 18.5, which is introduced by way of the connection 18.4 into the profile element 18.2.

Figure 19:
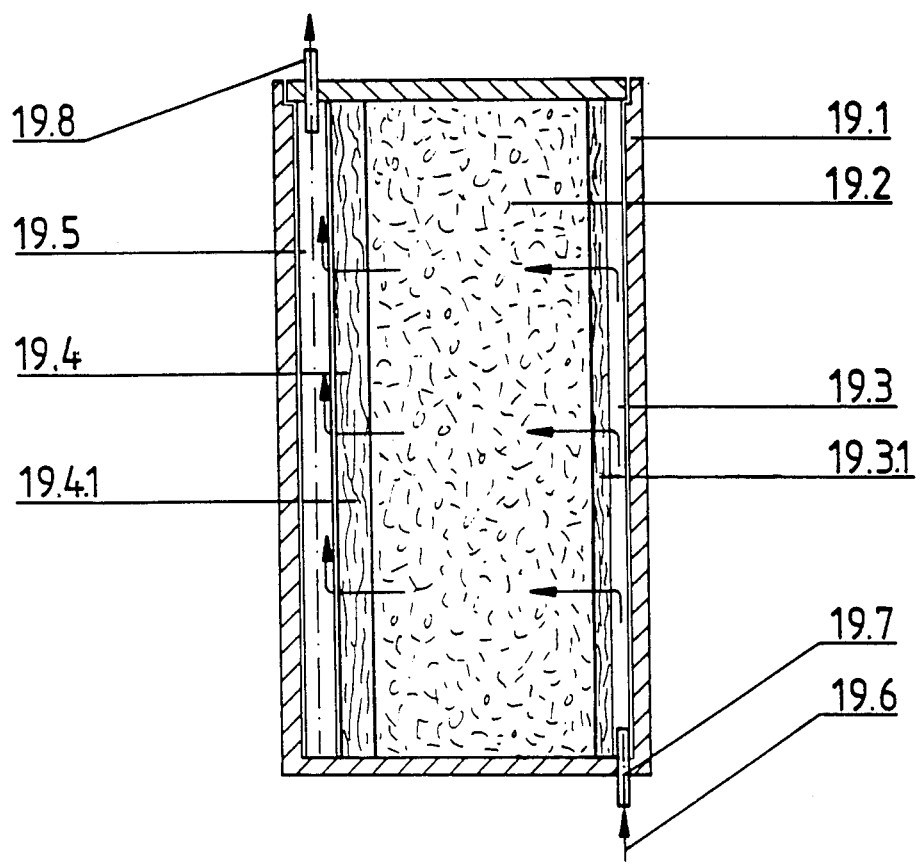

FIG. 19 shows how, in a manner which promotes the supply and waste removal function, several profile elements in accordance with the invention can be combined. In a container 19.1 which is closed on all sides, environmental material 19.2 is bounded on one side by a profile element 19.3 (similar to that shown in FIG. 9) and on the opposite side by profile elements 19.4 (similar to that shown in FIG. 8) and 19.5 (similar to that shown in FIG. 6). Gaseous or liquid flow material 19.6 is introduced by way of pipe connection 19.7 into the profile element 19.3 and flows through the effective substance 19.3.1 present in this. In so doing it is enriched and/or purified and it subsequently brings about enrichment and/or purification of the environmental material 19.2 before it is, upon the subsequently flowing-through the effective substance 19.4.1 in the profile element 19.4, enriched and/or purified afresh. The profile element 19.5 serves as collecting unit for the flow material 19.6, which is then carried off by way of another connection pipe 19.8.

We claim:

1. Profile elements of the type employed for supply or removal of fluid substances from granulated, fibrous, or crumbly soil-like material in an environment surrounding the profile elements comprising:
   a plurality of spaced apart webs; and
   associated boundary walls integrally connecting said webs and supported upon said webs so as to define a plurality of longitudinally arrayed side-by-side channels separated by respective ones of said webs, with each said web constituting a common side wall for adjacent channels;
   said boundary walls being shaped to provide an enlarged surface area compared to planar walls extending over an equivalent base area;
   said webs and said boundary walls being formed from an apertured mesh-like fabric to enable fluid communication between adjacent channels and between the channels and the surrounding environment.

2. Profile elements as in claim 1, wherein said webs or said walls include additional wick-like material.

3. Profile elements as in claim 1 wherein said channels are at least partly filled with an effective filtering substance.

4. Profile elements as in claim 3 wherein said filtering substance includes a filter packing.

5. Profile elements as in claim 1 wherein said filtering substance includes an active carbon.

6. Profile elements as in claim 1, wherein said webs or said walls further include additional material which is hydrophobic.

7. Profile elements of the type employed for supply of fluid substances to or removal of fluid substances from granulated, fibrous, or crumbly soil-like material in an environment surrounding the profile elements comprising:
   boundary walls shaped to define a multi-tubular construction of tubes integrally connected side-by-side in longitudinal array so as to have at least a portion of the walls common to adjacent ones of said tubes, said walls being formed from an apertured mesh-like fabric enabling fluid communication between the tube interiors and the surrounding environment.

8. A process of supplying fluid substances to or removal of fluid substances from granulated, fibrous, or crumbly soil-like material by use of profile elements that include a plurality of spaced apart webs and associated boundary walls that integrally connect the webs and are supported upon the webs so as to define a plurality of longitudinally arrayed side-by-side channels separated by respective ones of the webs, with each said web constituting a common side wall for adjacent channels, and with the boundary walls being shaped so as to provide an enlarged surface area as compared with planar walls extending over an equivalent base area; with the webs and the boundary walls being formed of an apertured mesh-like fabric to enable fluid communication both between the adjacent channels and with the surrounding environment, comprising the step of flowing said fluid substances through said profile elements.

9. The process of claim 8 wherein said fluid substances include liquids and said flowing includes initially flowing said liquid at a controlled, rapid supply rate, and thereafter flowing said liquid at a lower basic supply rate.

10. The process of claim 8, wherein load pressure introduced from said environment and said fluid is distributed evenly over a supporting surface for said profile element.

11. The process of claim 10, wherein said profile elements are arranged in a sandwiched configuration.

12. The process of claim 10 wherein said profile elements are arranged in a multi-tubular configuration.

13. The process of claim 8, wherein said profile elements are formed of a strong, stiff material, thereby omitting shaping containers, base supports, and the like.

* * * * *